United States Patent
Seidl et al.

(10) Patent No.: US 10,399,628 B2
(45) Date of Patent: Sep. 3, 2019

(54) SINGLE-TRACK MOTOR-OPERATED MOTOR VEHICLE HAVING SUPPORTING CLADDING

(71) Applicant: Bayerische Motoren Werke Aktiengesellschaft, Munich (DE)

(72) Inventors: Josef Seidl, Dingolfing (DE); Elmar Jaeger, Kempten im Allgaeu (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 170 days.

(21) Appl. No.: 15/446,755

(22) Filed: Mar. 1, 2017

(65) Prior Publication Data

US 2017/0174282 A1 Jun. 22, 2017

Related U.S. Application Data

(63) Continuation of application No. PCT/EP2015/072242, filed on Sep. 28, 2015.

(30) Foreign Application Priority Data

Oct. 31, 2014 (DE) ......................... 10 2014 222 297

(51) Int. Cl.
*B62K 11/00* (2006.01)
*B62J 17/00* (2006.01)
(Continued)

(52) U.S. Cl.
CPC .............. *B62J 17/00* (2013.01); *B62K 5/027* (2013.01); *B62K 11/04* (2013.01); *B62K 19/16* (2013.01);
(Continued)

(58) Field of Classification Search
CPC .......... B62J 17/00; B62K 11/04; B62K 19/16; B62K 5/027; B62K 19/48; B60K 11/06; B60K 11/08; B60Y 200/12
(Continued)

(56) References Cited

U.S. PATENT DOCUMENTS

| 4,334,589 A | 6/1982 | Asakura et al. |
| 4,440,412 A | 4/1984 | Kamiya |

(Continued)

FOREIGN PATENT DOCUMENTS

| CN | 1430562 A | 7/2003 |
| DE | 1 696 706 | 4/1955 |

(Continued)

OTHER PUBLICATIONS

International Search Report (PCT/ISA/210) issued in PCT Application No. PCT/EP2015/072242 dated Nov. 2, 2015 with English translation (eight pages).

(Continued)

*Primary Examiner* — Toan C To
(74) *Attorney, Agent, or Firm* — Crowell & Moring LLP

(57) ABSTRACT

A single-track and engine-operated motor vehicle is provided. The motor vehicle includes a frame support structure that receives at least one engine in a fastening manner. The frame support structure includes frame elements and at least one supporting cladding part made of fiber reinforced plastic. The overall stiffness of the frame support structure is determined by the at least one supporting cladding part.

17 Claims, 2 Drawing Sheets

(51) Int. Cl.
  *B62K 11/04*    (2006.01)
  *B62K 19/16*    (2006.01)
  *B62K 5/027*    (2013.01)
  *B62K 19/48*    (2006.01)
  *B60K 11/06*    (2006.01)
  *B60K 11/08*    (2006.01)

(52) U.S. Cl.
  CPC ............ *B62K 19/48* (2013.01); *B60K 11/06* (2013.01); *B60K 11/08* (2013.01); *B60Y 2200/12* (2013.01)

(58) Field of Classification Search
  USPC .................................................. 180/21, 219
  See application file for complete search history.

(56) References Cited

U.S. PATENT DOCUMENTS

| | | | | |
|---|---|---|---|---|
| 4,830,135 | A * | 5/1989 | Yamashita | B60K 11/08 123/41.7 |
| 5,330,029 | A * | 7/1994 | Yoshimura | B62J 17/00 180/219 |
| 7,503,609 | B2 * | 3/2009 | Misaki | B62J 9/00 296/37.1 |
| 9,598,135 | B2 * | 3/2017 | Shimizu | B62K 19/48 |
| 2002/0153368 | A1 * | 10/2002 | Gardner | B29C 70/82 219/545 |
| 2016/0016623 | A1 * | 1/2016 | Ishii | B62J 17/00 180/229 |
| 2016/0023713 | A1 * | 1/2016 | Kawata | B62M 7/04 180/219 |
| 2016/0076494 | A1 * | 3/2016 | Nishimura | B62K 11/00 180/219 |
| 2018/0086407 | A1 * | 3/2018 | Kaji | B62J 17/02 |
| 2018/0230328 | A1 * | 8/2018 | Nakagawa | C09D 175/04 |
| 2018/0244334 | A1 * | 8/2018 | Iwakami | B62K 19/02 |

FOREIGN PATENT DOCUMENTS

| | | |
|---|---|---|
| DE | 30 19 807 A1 | 12/1980 |
| DE | 30 26 970 A1 | 2/1981 |
| DE | 30 19 807 C2 | 8/1989 |
| DE | 42 24 120 A1 | 1/1994 |
| DE | 10 2012 108 785 A1 | 6/2014 |
| FR | 2 202 489 | 5/1974 |
| JP | 9-66877 A | 3/1997 |
| WO | WO 01/89916 A1 | 11/2001 |
| WO | WO 2010/080291 A1 | 7/2010 |

OTHER PUBLICATIONS

German-language Written Opinion (PCT/ISA/237) issued in PCT Application No. PCT/EP2015/072242 dated Nov. 2, 2015 (eight pages).

German Search Report issued in counterpart German Application No. 10 2014 222 297.4 dated Jan. 16, 2017 with partial English translation (13 pages).

English translation of Chinese Office Action issued in counterpart Chinese Application No. 201580038707.4 dated Mar. 8, 2019 (five pages).

* cited by examiner

SINGLE-TRACK MOTOR-OPERATED MOTOR VEHICLE HAVING SUPPORTING CLADDING

CROSS REFERENCE TO RELATED APPLICATIONS

This application is a continuation of PCT International Application No. PCT/EP2015/072242, filed Sep. 28, 2015, which claims priority under 35 U.S.C. § 119 from German Patent Application No. 10 2014 222 297.4, filed Oct. 31, 2014, the entire disclosures of which are herein expressly incorporated by reference.

BACKGROUND AND SUMMARY OF THE INVENTION

The invention relates to a single-track engine-driven motor vehicle having a frame support structure for receiving at least one engine in a fastening manner, wherein the frame support structure includes supporting cladding parts.

Load-bearing bodies are known from the prior art. In particular, in the case of relatively old scooters, their bodies even act as a chassis themselves. Body shapes of this type are unsuitable, however, for current motorcycles or scooters, since they do not have a sufficient stiffness and their handling is service-unfriendly in the case of repairs. For this reason, a change has been made, such as installing a frame as a load-bearing structure, to which, for example, the engine is fastened. In addition, fairing parts are attached to the frame for the design and/or aerodynamic improvement purposes. The known fairing parts do not contribute to the stiffness of the body or the frame construction, however. Rather, the various frame and fairing components and the assemblies compete for the installation space which is greatly restricted in motorcycles and scooters. The frame itself is always fixed, however, and restricts the accessibility to assemblies such as engine, transmission, etc. in the case of servicing. In addition, the frame is usually manufactured from steel and is therefore weight-intensive.

The invention is therefore based on the object of providing a motor vehicle with a frame support structure which is lighter, ensures more installation space for further components and, in the case of servicing, provides improved accessibility without significantly impairing the stiffness of the frame support structure.

This and other objects are achieved in accordance with embodiments of the invention. It is provided here according to the invention to form the frame support structure for receiving at least one engine of a motor vehicle, in particular a motorcycle or scooter, in a fastening manner from frame elements and at least one supporting cladding part made of fiber reinforced plastic. The overall stiffness of the frame support structure is determined by the at least one supporting cladding part.

It is provided in one advantageous embodiment that the at least one supporting cladding part is formed from Carbon Fiber Reinforced Plastic (CFRP). Here, a sandwich construction, in particular, is favorable, in the case of which an upper layer and a lower layer made from CFRP are connected to a spacer element which lies in-between, for example in the form of a polyurethane layer. As an alternative solution, it is possible to provide a honeycomb structure which, as is known, ensures a high stiffness along the honeycomb direction.

From the aspect of an economical and cost-optimized solution, it is favorable that the at least one supporting cladding part is formed from recycled CFRP molded material. Recycled CFRP molded material of this type can also be used in a sandwich construction as an upper and lower layer, as described above.

It is provided in a likewise advantageous design variant that the at least one supporting cladding part is configured as a cladding segment and stiffens flat sections of the frame support structure. In one embodiment as a cladding segment, the supporting cladding part can replace existing frame elements. One application is particularly suitable, for example, in the case of which a frame stiffening strut in the front part of the frame support structure is replaced by way of a supporting cladding part or a cladding segment.

The stiffness and therefore the load-bearing effect of the supporting cladding parts can be improved further if they are of multiple-walled configuration. It is provided here in one solution that the multiple-walled supporting cladding part has at least one flow-through opening, onto and/or through which flow can pass during driving in the installed state. Therefore, an aerodynamic effect by way of the supporting cladding part which also defines the frame support structure can assume additional tasks, by way of which the driving behavior can be influenced or assemblies can be cooled, for example, while driving at high speed. Furthermore, it is provided for the latter in one design variant that the supporting cladding part has through-holes at least in sections, and the through-holes extend through at least one wall in the case of a multiple-walled configuration, with the result that the air which flows through has a cooling action. In one particular embodiment, two walls of the multiple-walled construction form a nozzle, within which the pressure drops during the flowing through (Bernoulli equation). In the case of a simultaneous arrangement of the through-holes within the nozzle, the negative pressure can be used to extract hot air, for example.

In a further advantageous design variant, a heat protection foil which makes mounting close to the engine possible is arranged on the at least one supporting cladding part.

Furthermore, an exemplary embodiment is favorable, in which the at least one supporting cladding part is configured in two parts and can be assembled, with the result that mounting and dismantling it from two sides is ensured.

The invention comprises various arrangements of the supporting cladding part. It is favorable, however, in the case of a motorcycle that the frame support structure is configured so as to enclose the engine, the frame elements defining an upper driver-side section, a section which points toward a front wheel and a section which points toward a rear wheel, and the at least one supporting cladding part defining a lower section which points toward the roadway. This is precisely the other way around in the case of a motor scooter which requires a step-through for legs. Here, the frame support structure is configured so as to enclose the engine, the frame elements defining a lower section which points toward the roadway, a section which points toward a front wheel and a section which points toward a rear wheel, and the at least one supporting cladding part defining a driver-side section.

Further advantageous developments of the invention are characterized in the sub-claims and/or will be shown in greater detail in the following text together with the description of the preferred embodiment of the invention using the figures, in which, by way of example and diagrammatically.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
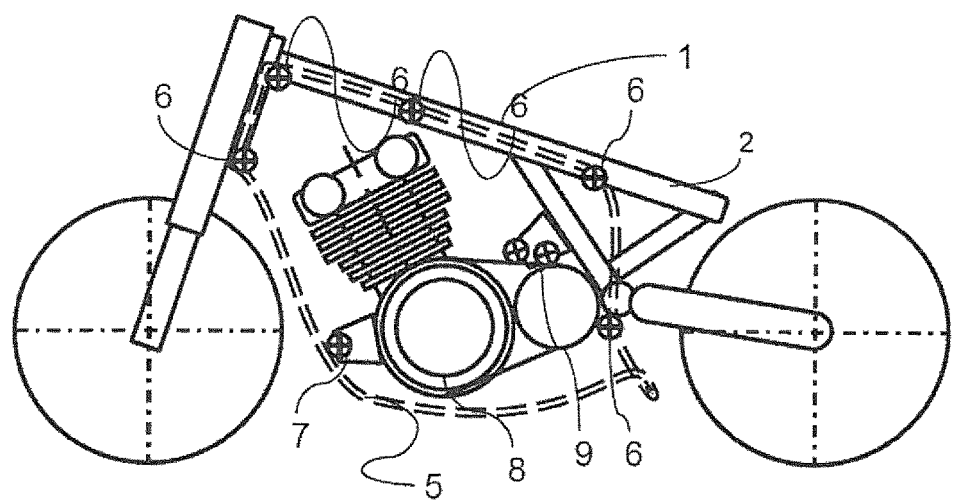
FIG. 1 is a side view of an exemplary embodiment of a motorcycle.

FIG. 1 shows an exemplary embodiment of a motorcycle having a frame support structure 1 for receiving at least one drive device 8, 9 with a motor in a fastening manner, the frame support structure 1 being formed from frame elements 2 and at least one supporting cladding part 5 made from fiber reinforced plastic. The overall stiffness of the frame support structure 1 is determined by the at least one supporting cladding part 5 because it interacts directly with the frame elements 2. In the exemplary embodiment shown in FIG. 1, the engine is received at fastening points 6, 7 in a manner, in which the engine is fastened to the frame support structure 1. The support by the cladding parts is realized by way of a plurality of connected supporting cladding parts 5 which are provided partially solely in the region below the engine, and partially additionally in the region of the frame elements 2 which are used.

Figure 2:
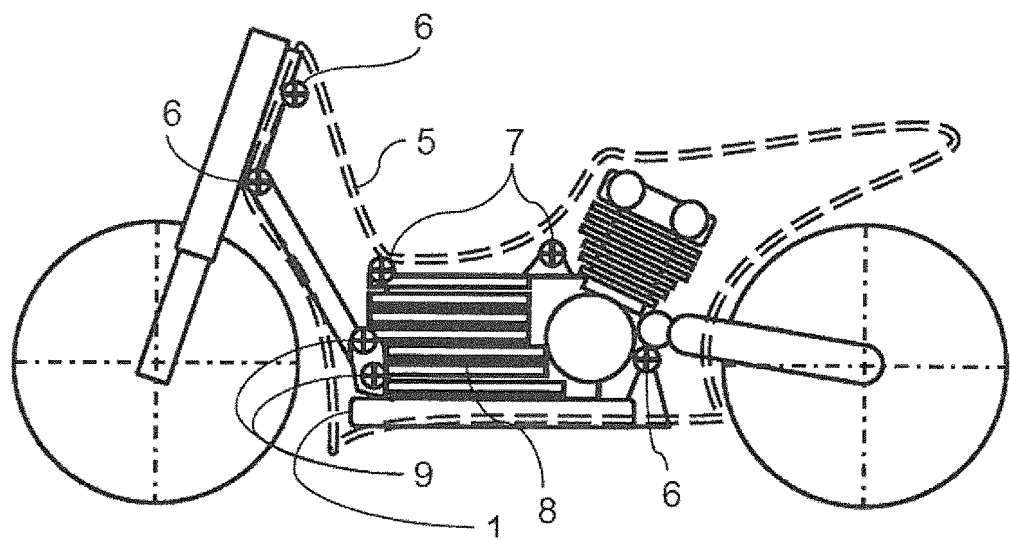
FIG. 2 is a side view of an exemplary embodiment of a motor scooter.

FIG. 2 shows an alternative embodiment of FIG. 1 using the supporting cladding parts 5 on a motor scooter with a step-through region. The supporting cladding parts 5 are provided so as to surround the entire drive device 8, 9 and, in particular, also provided in the upper rider's seat region.

Figure 3:
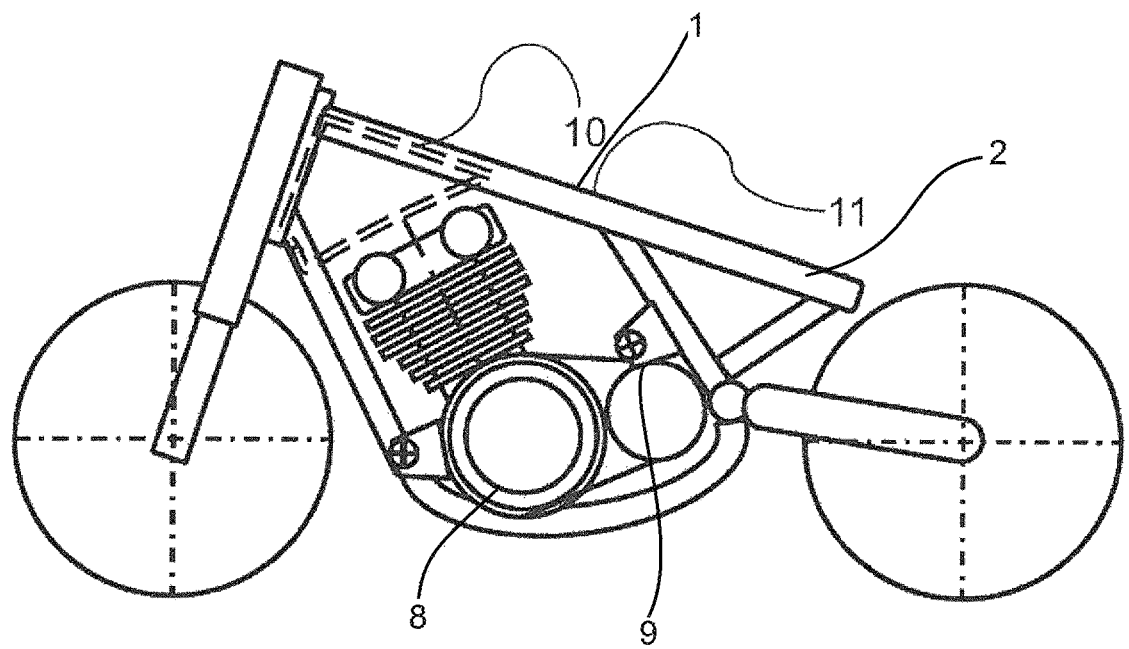
FIG. 3 is a side view of an exemplary embodiment of a motorcycle in a further design variant.

FIG. 3 shows another exemplary embodiment that illustrates a cladding segment 10 in a triangular form as a replacement for conventional transverse struts in the triangular region between the top tube 11 of the frame support structure 1 and frame elements 2 which surround the drive device 8, 9. The cladding segment 10 is fastened releasably and can be removed in the case of servicing, with the result that the installation space above the engine is increased in size. As a result, for example, the valve play can be set more easily.

Figure 4:
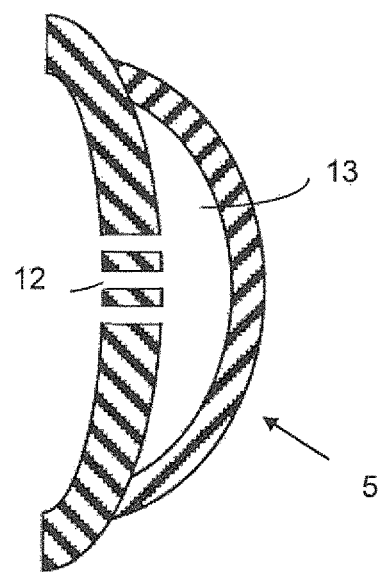
FIG. 4 is a lateral sectional view of an exemplary embodiment of a multiple-walled supporting cladding part.

FIG. 4 shows a lateral sectional view of an exemplary embodiment of a multiple-walled supporting cladding part 5 having a flow-through opening 13 between two walls. The flow-through opening 13 can be configured as a nozzle. One wall of the multiple-walled supporting cladding part 5 is provided with passage openings 12, in order to make an entry of air into the flow-through opening 13 possible and, for example, to discharge hot air from assemblies such as engine/transmission/exhaust gas system, etc. In addition, for example, a heat protection foil (not shown) can be provided on the inner side.

The realization of the invention is not restricted to the preferred exemplary embodiments described above. Rather, a number of variants are conceivable, which use the above-described solutions, even in the form of embodiments of a fundamentally different type. For example, further fiber composite materials can also be used. According to the exemplary aspects of the invention, scooters having two front wheels and one rear wheel are also understood to be motor scooters.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single-track and engine-operated motor vehicle, comprising:
    a frame support structure for receiving at least one engine in a fastening manner, wherein
    the frame support structure includes frame elements and at least one supporting cladding part made of fiber reinforced plastic that is configured to bear a structural load as a portion of the frame support structure, and
    an overall stiffness of the frame support structure is determined by the at least one supporting cladding part.

2. The motor vehicle according to claim 1, wherein the at least one supporting cladding part is made of carbon fiber reinforced plastic (CFRP) and is in a sandwich construction.

3. The motor vehicle according to claim 2, wherein the at least one supporting cladding part is made of recycled CFRP molded material.

4. The motor vehicle according to claim 1, wherein the at least one supporting cladding part is configured as a cladding segment and stiffens a flat section of the frame support structure.

5. The motor vehicle according to claim 2, wherein the at least one supporting cladding part is configured as a cladding segment and stiffens a flat section of the frame support structure.

6. The motor vehicle according to claim 1, wherein the at least one supporting cladding part replaces at least one of the frame elements.

7. The motor vehicle according to claim 6, wherein the at least one of the frame elements is a frame stiffening strut disposed at a front part of the frame support structure.

8. The motor vehicle according to claim 1, wherein the at least one supporting cladding part is configured to have multiple walls with at least one flow-through opening between the multiple walls.

9. The motor vehicle according to claim 5, wherein the at least one supporting cladding part is configured to have multiple walls with at least one flow-through opening between the multiple walls.

10. The motor vehicle according to claim 7, wherein the at least one supporting cladding part is configured to have multiple walls with at least one flow-through opening between the multiple walls.

11. The motor vehicle according to claim 1, wherein the at least one supporting cladding part has through-holes.

12. The motor vehicle according to claim 8, wherein the at least one supporting cladding part has through-holes, and the through holes extend through at least one of the multiple walls.

13. The motor vehicle according to claim 10, wherein the at least one supporting cladding part has through-holes, and the through holes extend through at least one of the multiple walls.

14. The motor vehicle according to claim 1, wherein the at least one supporting cladding part has a heat protection foil arranged thereon.

15. The motor vehicle according to claim 1, wherein the at least one supporting cladding part is made up of two pieces assembled together such that both sides of the at least one supporting cladding part is usable for mounting purpose.

16. The motor vehicle according to claim 1, wherein the motor vehicle is a motorcycle, and the frame support structure is configured so as to enclose the engine, the frame elements defining an upper driver-side section, a section which points toward a front wheel and a section which points toward a rear wheel, and the at least one supporting cladding part defining a lower section which points toward a roadway.

17. The motor vehicle according to claim 1, wherein
the motor vehicle is a motor scooter having two or three wheels, and
the frame support structure is configured so as to enclose the engine, the frame elements defining a lower section which points toward a roadway, a section which points toward a front wheel and a section which points toward a rear wheel, and the at least one supporting cladding part defining a driver-side section.

* * * * *